April 9, 1963   C. J. SLETTEN   3,085,204
AMPLITUDE SCANNING
Filed Sept. 3, 1958   4 Sheets-Sheet 1

INVENTOR.
CARLYLE J. SLETTEN
ATTORNEYS

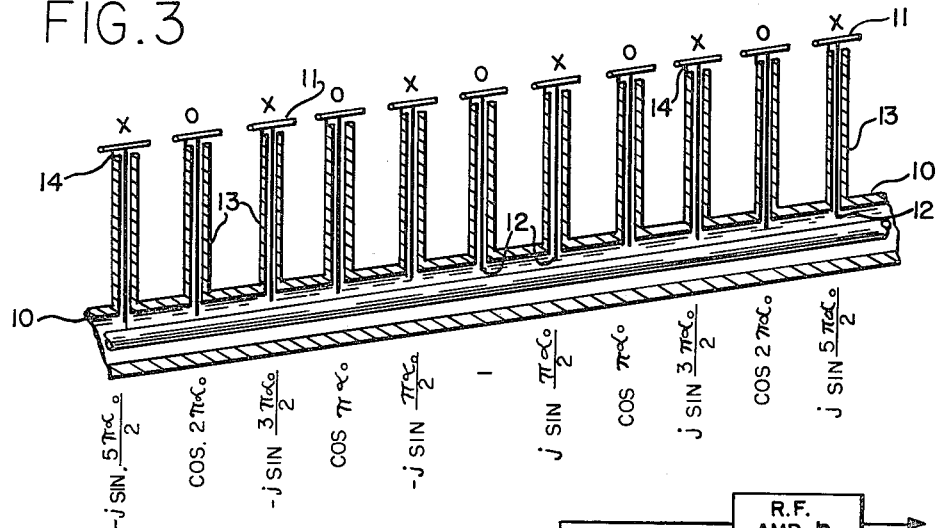
FIG. 3
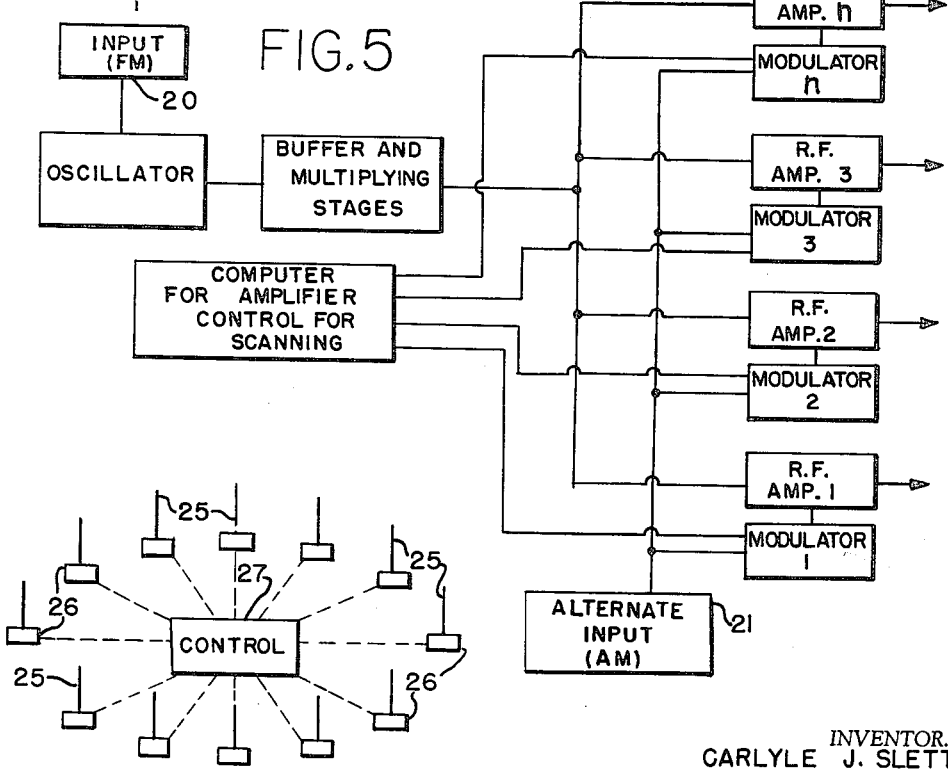
FIG. 5
FIG. 6

April 9, 1963　　　C. J. SLETTEN　　　3,085,204
AMPLITUDE SCANNING
Filed Sept. 3, 1958　　　　　　　　　　　4 Sheets-Sheet 3

INVENTOR.
CARLYLE J. SLETTEN
ATTORNEYS

United States Patent Office 3,085,204
Patented Apr. 9, 1963

3,085,204
AMPLITUDE SCANNING
Carlyle J. Sletten, Acton, Mass., assignor to the United States of America as represented by the Secretary of the Air Force
Filed Sept. 3, 1958, Ser. No. 758,869
5 Claims. (Cl. 325—180)
(Granted under Title 35, U.S. Code (1952), sec. 266)

The invention described herein may be manufactured and used by or for the United States Government for governmental purposes without payment to me of any royalty thereon.

The invention relates generally to scanning antenna systems and more particularly to a novel method and means for producing a radiation pattern having rotary motion about an antenna array by utilizing such antenna array for the propagation of an electronically steerable beam of radiant energy.

Prior devices have utilized cumbersome mechanical means to produce a rotation of the entire physical structure of an antenna in order to produce beam scanning of an area in space. Devices of this nature, in addition to being bulky, are expensive and limited in the rapidity of the scanning operation.

Electronic scanning antenna systems have been proposed wherein a variation of either the frequency or the phase of the energy along an array is utilized to produce a beam movement; however, either a change in antenna dimensions or complicated, expensive devices are necessary for an accurate control of a beam of radiated energy.

The method and means forming this invention for electronic scanning may be effected by various means which easily and accurately change only the amplitude to elements of an array. This can be accomplished by substantially different means, e.g. controlling a voltage applied to grids of amplifiers which feed separate radiating elements in an array or by utilizing low powered transmitting sources on each radiated element and amplitude modulating these sources. Amplitude scanning also may utilize simple mechanical movement of antenna elements for varying the coupling and thereby the amplitude to the various elements.

Accordingly, it is an object of this invention to produce a novel method and means for scanning by rotary progression over an area in space, without rotation of the antenna array at the center of scan, the said novel method involving the step of utilizing a control of the amplitude of the signal fed to individual radiating elements of an antenna array.

It is another object of this invention to produce a novel means for scanning by use of a beam of propagated electromagnetic energy which novel means is easily produced and attains a high degree of accuracy.

A further object of this invention involves the production of a scannable antenna system utilizing conventional, currently available, components.

Another object of this invention involves the utilization of switching means to apply fixed amplitude signals to elements of an antenna array to cause movement of a beam of electromagnetic energy in space.

Still another object of this invention involves the utilization of variable couplings to elements of an antenna array to vary the amplitude of the signal applied to said elements thereby causing the radiated beam to scan the spatial area swept by the beam as it rotates about said antenna array.

A still further object of the invention involves the utilization of low powered transmitting sources to elements of an array and amplitude modulating these sources to produce an electronically steerable transmitted beam.

It is another object of this invention to utilize variable gain amplifiers to feed elements of an antenna array to cause an amplitude scanning by amplitude modulation of a transmitted beam.

A further object of this invention involves the utilization of a scanning principle employing amplitude modulation capable of scanning a beam from a circular array.

A still further object of this invention is to produce a system capable of scanning an array used for receiving electromagnetic energy by utilizing a variable gain radio frequency amplifier at each element of the array and combining the output of these amplifiers to produce a steerable directive receiving system or multiple beams from many receivers.

These and other advantages, features and objects of the invention will become more apparent from the following description taken in connection with the illustrative embodiments in the accompanying drawings, wherein:

FIGURE 3 is a schematic representation of an array to give the summation of the pattern of FIGURE 1 and 2 with the feeding coefficients given for each element in the array;

FIGURE 5 is a block diagram of a means for continuous amplitude scanning by amplitude modulation of radiation to array elements;

FIGURE 6 is a schematic showing of circular array capable of being amplitude scanned;

The mathematical approach to amplitude scanning is based on my copending application No. 615,208, filed November 10, 1956, entitled Antenna Array Synthesis Method and Apparatus wherein it is shown that quarter wave spaced radiators with alternate elements in phase quadrature may be used to synthesize any antenna pattern. An extension of the principles taught in that application would allow for the creation of a sharp antenna pattern wherein the pattern may be made to assume various angular positions by varying the amplitude of the feeding coefficients in accordance with the following analysis and theory.

In accordance with the theory presented in my aforementioned copending application, the shape of a beam to be generated my be idealized and generated at a given angle, $\alpha_0$, with the normal to an array and determine the coefficients $Cn$ and $Bn$. Thus, for example, with a rectangular beam $2\tau$ in width at an angle $\alpha_0$ from the normal, then $$Cn = \frac{2}{n\pi}(\sin n\pi\alpha_0 \cos n\pi\tau + \cos n\pi\alpha_0 \sin n\pi\tau - \sin n\pi\alpha_0)$$

$$Bn = \frac{2}{(n+\frac{1}{2})\pi}\begin{bmatrix}-\cos (n+\frac{1}{2})\pi\alpha_0 \cos (n+\frac{1}{2})\pi\tau \\ +\sin (n+\frac{1}{2})\pi\alpha_0 \sin (n+\frac{1}{2})\pi\tau \\ +\cos (n+\frac{1}{2})\pi\alpha_0\end{bmatrix}$$

The technique of the above theory may be illustrated by reference to FIGURES 1–3, in which is developed a system that approaches a uniformly illuminated array, wherein $$\frac{2}{\lambda d} = l = 1$$

where $d$ is the element spacing. The mathematical terminology, being an extension of the principles of application Serial No. 615,208, follows the use of the specific terms given in said application.

Figure 1:
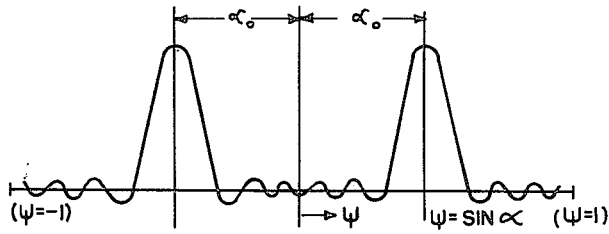
FIGURE 1 is a representation of an even part of a scanning pattern.
Figure 2:
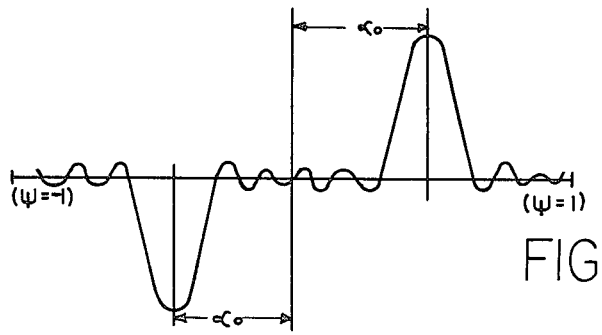
FIGURE 2 is a representation of an odd part of a scanning pattern.

A desired pattern is obtained by constructing an even function $f_{r,o}(\alpha) = f_u(\psi)$ as shown graphically in FIGURE 1 and adding to it an odd function $f_{r,o}(\alpha) = f_v(\psi)$ as shown in FIGURE 2. The resultant pattern will then be a superposition of the two amplitude functions. In the figures $\psi = \sin \alpha$ where $\alpha$ is measured from the normal to the array axis.

To obtain the even function, consider the following expansion in a finite series:

$$\frac{\sin(2n+1)\frac{\pi\psi}{2}}{\sin\frac{\pi\psi}{2}} = 1 + 2\sum_{1}^{n} \cos n\pi\psi$$

To obtain the pattern of FIGURE 1, $f_u(\psi)$ can be written as $$f_u(\psi,\psi_0)$$
$$= \frac{1}{2}\left[\frac{\sin(2n+1)\frac{\pi}{2}(\psi-\psi_0)}{\sin\frac{\pi(\psi-\psi_0)}{2}} + \frac{\sin(2n+1)\frac{\pi}{2}(\psi+\psi_0)}{\sin\frac{\pi(\psi+\psi_0)}{2}}\right]$$

which when expanded yields $$f_u(\psi,\psi_0) = 1 + 2\sum_{1}^{n} \cos n\pi\psi \cos n\pi\psi_0$$

The odd function needed is obtained by using the following expansion:

$$\frac{\sin 2(m+1)\frac{\pi\psi}{2}}{\sin\frac{\pi\psi}{2}} = 2\sum_{0}^{m} \cos(m+\tfrac{1}{2})\pi\psi$$

By using this expansion we can express the odd function $f_{r,o} = f_v(\psi)$ shown in FIGURE 2 as $$f_v(\psi,\psi_0)$$
$$= \frac{1}{2}\left[\frac{\sin 2(m+1)\frac{\pi}{2}(\psi-\psi_0)}{\sin\frac{\pi(\psi-\psi_0)}{2}} - \frac{\sin 2(m+1)\frac{\pi}{2}(\psi+\psi_0)}{\sin\frac{\pi(\psi+\psi_0)}{2}}\right]$$

which when expanded yields $$f_v(\psi,\psi_0) = 2\sum_{0}^{m} \sin(m+\tfrac{1}{2})\pi\psi \sin(m+\tfrac{1}{2})\pi\psi_0$$

The desired pattern is then obtained by adding the two functions $$f(\psi,\psi_0) = f_u(\psi,\psi_0) + f_v(\psi,\psi_0)$$
$$= 1 + 2\sum_{1}^{n} \cos n\pi\psi_0 \cos n\pi\psi + \sum_{0}^{m} \sin(m+\tfrac{1}{2})\pi\psi_0$$
$$\cdot \sin(m+\tfrac{1}{2})\pi\psi$$

where $m$ is equal to $n-1$. The displacement of the main beam from the perpendicular to the array is given by $\alpha_0$ (note that $\psi_0 = \sin \alpha_0$ and $\psi = \sin \alpha$). The feeding coefficients for the array are given by the $\cos n\pi\psi_0$ and $\sin(m+1/2)\pi\psi_0$ terms. The desired fixed phasing on the array can be obtained by comparing the feeding coefficients of $f(\psi, \psi_0)$ with the resolution of the radiated pattern in terms of phase on a transmission line as given in the aforementioned copending application. A representation of the array is shown in FIGURE 3, wherein the spacing between adjacent elements is $\lambda/4$.

In FIGURE 3 a coaxial line 10 is used to feed a series of $\lambda/2$ dipoles 11 having probes 12 extending from the center of the dipoles 11 into said line 10. A tubular housing 13 surrounds the probes and is in electrical contact with said dipoles as shown schematically at 14 and with the outer conductor of coaxial line 10. The coefficients are listed below each dipole; the sine terms, at $x$, representing the odd function, the remaining terms, at O, representing the even function.

Figure 4:
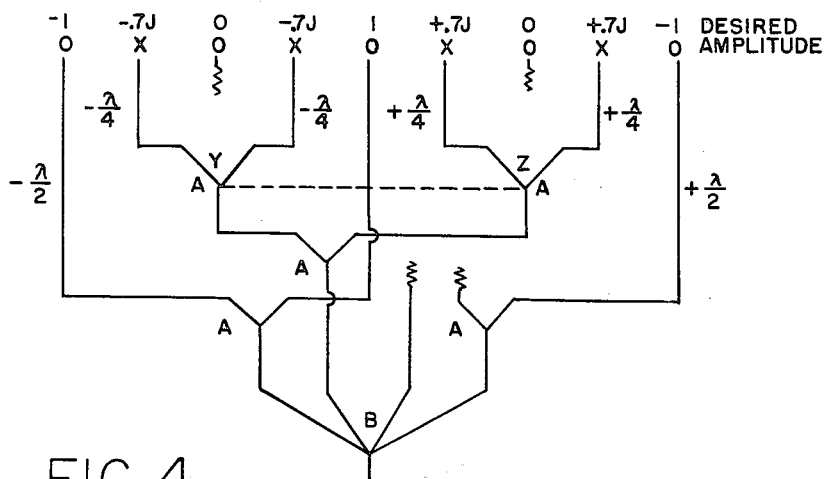
FIGURE 4 is a schematic representation of an element array capable of moving a beam in the positions of $+30°$, $0°$, and $-30°$.

FIGURE 4 shows a passive phase stable network to feed nine elements (not shown), of an array. The network, as shown schematically, may be fed by a coaxial cable with the strip line power divider shown having two-way power dividers at A and a four-way power divider at B to feed the elements at the correct amplitudes for a beam broadside and at scan angles of $+30°$ and $-30°$. In the feeding network needed for a $+30°$ scan angle as shown in FIGURE 4, it should be noted that the path lengths from the four-way power dividing network B differ by $+\lambda/4$, $-\lambda/4$, and $+\lambda/2$ with respect to the center element of the array for proper fixed phasing. The half-wavelength increase of the transmission lines feeding the outer two elements will result in the desired $-1$ amplitude and the quarter-wavelength path difference in the line containing 3 db power dividers will result in the desired $\pm 0.7j$ amplitudes. In an electronic scanning arrangement the negative amplitude needed would be obtained by a phase change of $180°$, thus allowing the path lengths to remain fixed for all scan angles.

In FIGURE 4, as in FIGURE 3, the elements marked $x$ generate the odd function while those marked O generate the even function. The $180°$ phase shift for changing the amplitudes from positive to negative is achieved by a switch, not shown, which physically reverses the connections at Y and Z for $-30°$ propagation of a beam. For broadside propagation the unit of FIGURE 4 would have the elements generating the odd function (marked $x$) terminated in matched loads and the even functions (marked O) fed by a different feed with unity amplitudes. The electrical symbols for resistors in this figure represent matched loads which are attached to units which are not energized for the $+30°$ scan or $-30°$ scan; however, for angles other than $\pm 30°$, radiation would be necessary from the elements shown connected with these loads and the loads would then be disconnected.

The physical switching of the embodiment of FIGURE 4 gives a beam at particular intervals while the block diagram of FIGURE 5 shows a method of continuously scanning a beam by varying the amplitude to the individual elements of an array.

In FIGURE 5, amplitude modulation of radiation to elements of an array is shown to produce scanning of a linear array. This must be done without phase variation from locked phase quadrature conditions while a control voltage required for each element will be varied to scan the beam. Intelligence may be applied at 20 for use as a frequency modulated or pulse modulated system or at 21 for use as an amplitude modulated system. Assuming an FM system, the intelligence is fed at 20 to an oscillator whose signal is buffered and multiplied to give the proper freqeuncy to be applied in proper phase to the R.F. amplifiers for application to the elements of an array. A computer for determining the variation in amplitude necessary for a scan of the antenna beam applies a signal to modulators which are connected to modulate the signals of the R.F. amplifiers, thus changing the amplitude of the signal to be presented to individual radiating elements. With an AM signal the amplitude modulated signal is presented to the modulators where it has modulated on it a signal from the computer to vary the signal strength to each R.F. amplifier and thence to the radiating elements. Of course, separate phase stabilized power amplifiers such as the type disclosed in application Serial No. 758,868, filed September 3, 1958, now U.S. Patent No. 2,976,493, entitled Phase Stable Amplifier to Allan C. Schell may be used to vary the gain to the radiating elements.

The circular array, schematically shown in FIGURE 6, is admirably suited for amplitude scanning wherein a signal from separate variable feeds are presented to dipole elements 25 spaced approximately .2λ apart. Once the proper amplitudes necessary to produce a pencil beam with a fixed phase circular array is known, the beam can be scanned in any direction by simple permutation of the excitation coefficients by means of variable power, phase stable amplifiers 26 controlled by a program control means 27 which, for example, may be a punched tape. On a circular array the beam would of course be the same for any direction, the number of possible directions being limited only by the number of elements in the array.

Figure 7:
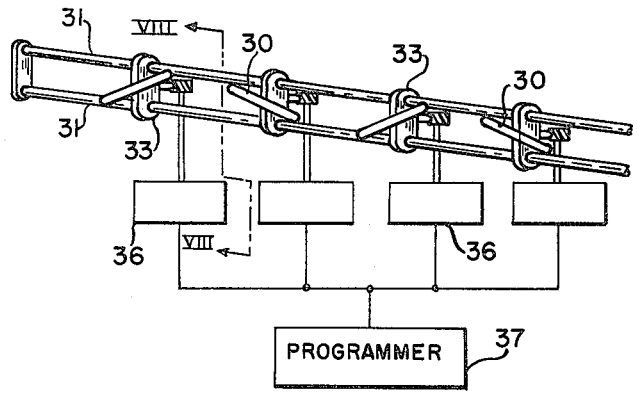
FIGURE 7 is a representation of an array using variable coupling to amplitude scan a radiated beam.
Figure 9:
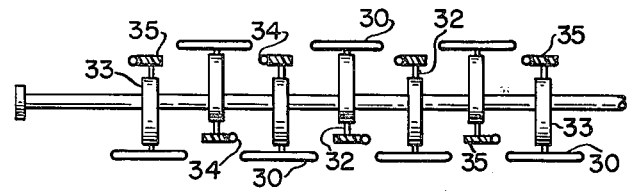
FIGURE 9 is a representation of an additional embodiment using variable coupling for amplitude scanning.
Figure 8:
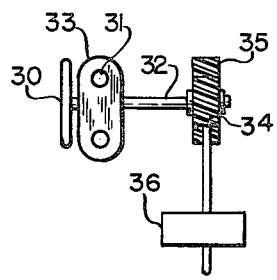
FIGURE 8 is a view along line VIII—VIII illustrating a means for rotating the elements of the array.

Mechanical movement of antenna elements to achieve a variation in coupling, which in turn produces a variation in amplitude to the various elements, is illustrated in FIGURES 7 and 8. The utilization of angular positioning of an element on a two-wire line to achieve a predetermined coupling is taught in my copending application Serial No. 613,011, filed October 1, 1956, now U.S. Patent No. 2,963,703, entitled Method and Means for Antenna Coupling. An extension of this theory involves the rotation of these elements to vary the coupling and therefore the amplitude of the signal to each dipole to cause the scanning of an antenna beam. By placing dipoles 30 along a two-wire line 31 with $3\lambda g/4$ spacing and supporting them at their center by means of a shaft 32 in a spacing element 33, a rotation can be effected by a worm 34 and gear 35 which are controlled by a servo 36 which in turn is controlled by a programmer 37 to vary the coefficients to scan the beam. FIGURE 9 shows an additional embodiment utilizing the rotation of elements along a two-wire line; however, in this case the dipoles are spaced at quarter wavelength intervals on alternate sides of the two-wire line and varied between the fixed limits in the manner of FIGURE 7. The beam in FIGURE 9 is swept in a plane containing the two wires of the two-wire line.

Thus, it can be seen that amplitude scanning can be utilized for any antenna array having equispaced elements in phase quadrature. Different spacings between the elements would vary the pattern throughout the scan. Slight variations in phase as the amplitude is varied may be tolerated; however, an appreciable variation would cause a deterioration of the pattern as the beam is scanned.

Figure 10:
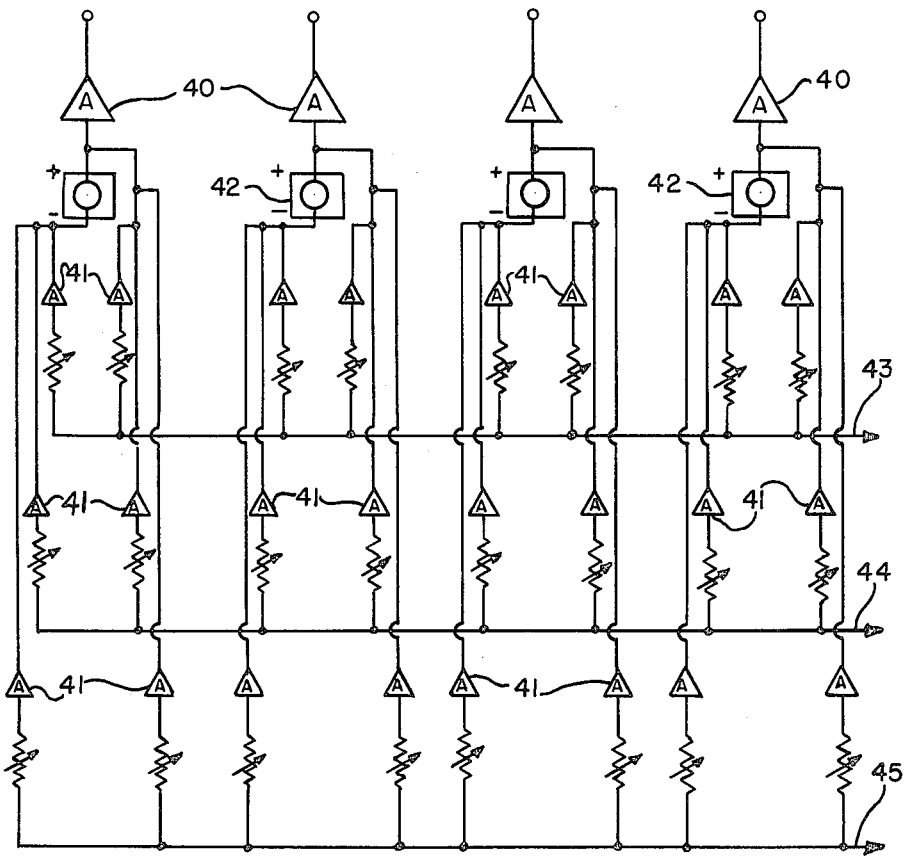
FIGURE 10 is a partially schematic representation of an application of the amplitude scanning technique to an antenna array used for receiving a signal to produce multiple beams.

FIGURE 10 illustrates the scanning of an array, on receiving, using amplitude scanning techniques. Signals are received on the λ/4 spaced antenna elements (not shown) and are fed to preamplifiers 40 to raise the signal above the noise level while at the same time maintaining the phase of the input signal. The line lengths are alternately changed at λ/4 values to create a 90° phase shift between elements. The power is then divided, in this example, to two pairs of three variable gain amplifiers 41 or attenuators, one set of which has the signal inverted 180° in a phase inverter 42. The first, second and third of each pair go to separate addition buses 43, 44 and 45, respectviely, and a summation of the signals from each element are combined on the buses to give three beams. A comparison of these beams may be used, for example, to determine the location of a communication or radar signal source. An application of amplitude scan on receiving, accomplished by using a variable-gain radio frequency amplifier at each element of the array and combining the output of these amplifiers, can be used to produce a steerable directive receiving system or multiple beams from many receivers.

Although the invention has been described with reference to particular embodiments, it will be understood to those skilled in the art that the invention is capable of a variety of alternative embodiments within the spirit and scope of the appended claims.

I claim:

1. A system for continuously electronically steering a beam of electromagnetic energy in space comprising an array of radiating antenna elements, first means for applying radio frequency signals to each of said elements for propogation in fixed phase relationship, second means for individually varying the amplitude of the radio frequency signals applied to each of said elements, control means for said second means whereby said second means is operated in accordance with a predetermined pattern so as to provide alternate ones of said elements with signals having the even function $$1+2\sum_1^n \cos n\pi\psi \cos n\pi\psi_0$$

and to provide the remaining elements with signals having the odd function $$2\sum_0^m \sin (m+\tfrac{1}{2})\pi\psi \sin (m+\tfrac{1}{2})\pi\psi_0$$

the summation of these functions giving a composite beam having the function $$1+2\sum_1^n \cos n\pi\psi_0 \cos n\pi\psi$$
$$+\sum_0^m \sin (m+\tfrac{1}{2})\pi\psi_0 \sin (m+\tfrac{1}{2})\pi\psi$$

whereby the resultant radiated beam of energy is scanned.

2. The system of claim 1 wherein said first means comprises a transmission line in signal coupling relationship with said radiating antenna elements.

3. The system of claim 2, wherein said second means comprises mechanical means for varying the orientation of said radiating antenna elements with respect to said transmission line to vary the coupling between said line and said elements.

4. The system of claim 1, wherein said radiating antenna elements are arranged in a circle, said first means comprising a phase stable amplifier connected with each of said elements and said second means comprising program control means connected with said phase stable amplifiers.

5. The system of claim 1, said first means comprising a radio frequency amplifier connected with each of said elements, said second means comprising a modulator connected with each of said amplifiers for modulating the amplitude of said radio frequency signals, and said control means comprising a computer for controlling said modulators in accordance with said predetermined pattern.

References Cited in the file of this patent
UNITED STATES PATENTS

| | | |
|---|---|---|
| 2,286,839 | Schelkunoff | June 16, 1942 |
| 2,419,562 | Kandoian | Apr. 29, 1947 |
| 2,429,726 | Lewis | Oct. 18, 1947 |
| 2,430,568 | Hershberger | Nov. 11, 1947 |
| 2,480,829 | Barrow et al. | Sept. 6, 1949 |
| 2,605,413 | Alvarez | July 29, 1952 |
| 2,852,772 | Gitzendanner | Sept. 16, 1958 |

OTHER REFERENCES

"Antennas," by Kraus, copyright 1950, pp. 93 to 106.

Dunbar article, Journal of Applied Physics, vol. 23, No. 8, August 1952, pp. 847–853.